United States Patent

[11] 3,624,541

[72] Inventor John W. Lundstrom
Glendora, Calif.
[21] Appl. No. 873,274
[22] Filed Nov. 3, 1969
[45] Patented Nov. 30, 1971
[73] Assignee Moisture Register Company
Alhambra, Calif.

[54] OSCILLATOR CIRCUIT
9 Claims, 1 Drawing Fig.

[52] U.S. Cl. .......... 331/65, 317/2, 317/62, 324/61, 331/117, 331/109, 331/185, 331/176
[51] Int. Cl. .......... G01r 27/26
[50] Field of Search .......... 324/61, 65; 343/285; 317/62, 2; 331/117, 109, 185, 176

[56] References Cited

UNITED STATES PATENTS

| | | | |
|---|---|---|---|
| 2,793,331 | 5/1957 | Lamb | 317/62 |
| 3,046,479 | 7/1962 | Mead et al. | 324/61 |
| 3,239,778 | 3/1966 | Rywak | 331/176 |
| 3,242,441 | 3/1966 | Auernheimer | 331/185 |
| 3,416,096 | 12/1968 | Kim | 331/117 |
| 3,421,108 | 1/1969 | Keller | 331/62 |

FOREIGN PATENTS

| | | | |
|---|---|---|---|
| 854,237 | 11/1960 | Great Britain | 317/2 |

*Primary Examiner*—John Kominski
*Attorney*—Forrest J. Lilly

ABSTRACT: A field-effect transistor connected in a class C Hartley oscillator circuit has a diode connected to the gate to provide bias. A similar diode is connected in series with the source to provide temperature stabilization of the operating point. Further temperature stabilization is obtained by means of a thermistor-compensated load network. The biasing diode protects against positive high-voltage transients developed in the vicinity of moisture-sensing electrodes coupled to the tank circuit. A second diode is reverse-biased and coupled to the gate with opposite polarity to protect against negative transients. A zener diode connected to the drain prevents it from developing transients of negative voltage. To further protect against high-voltage transients, the moisture-sensing electrodes are coupled to the tank circuit through low-pass filters loaded by neon glowtubes.

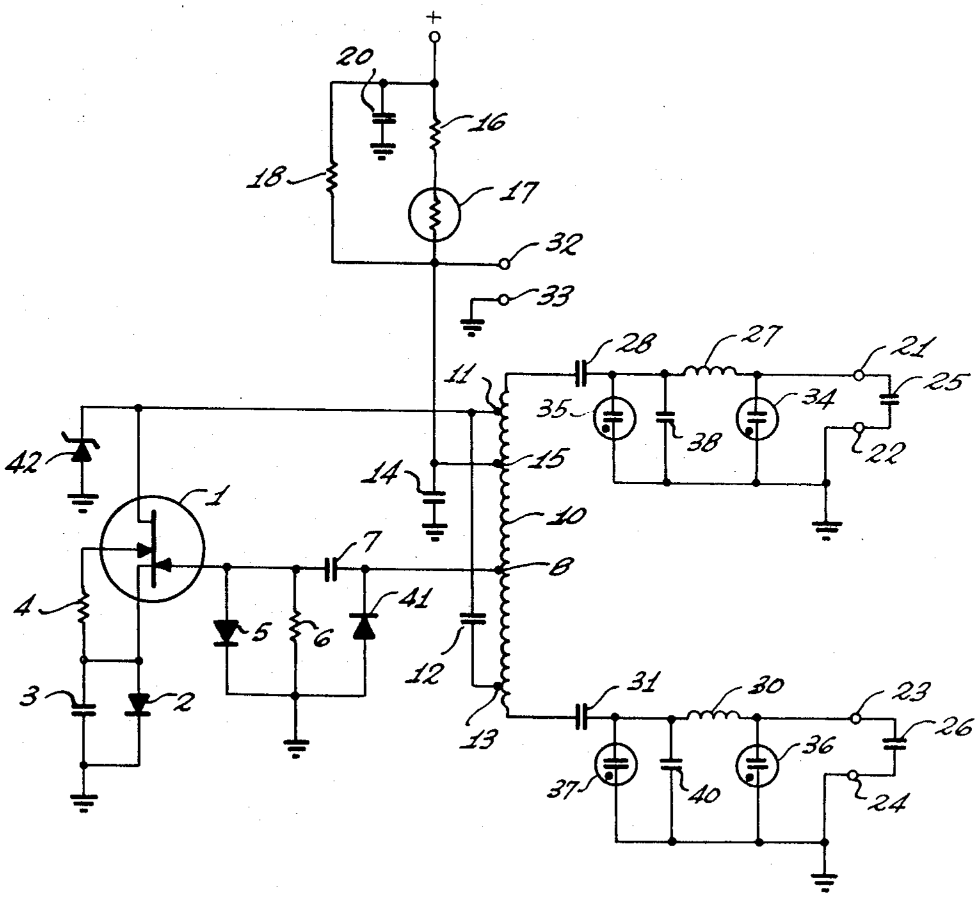
INVENTOR.
JOHN W. LUNDSTROM
By Forrest J. Lilly
ATTORNEY

OSCILLATOR CIRCUIT

BACKGROND OF THE INVENTION

The present invention relates to oscillator circuits, and more particularly to a self-biased, Class C oscillator, employing a field-effect transistor and having protection against high-voltage transients.

In some applications, it is desirable to employ a field-effect transistor as a Class C oscillator. One such application is in the measurement of dielectric loss factor. A specific example is a moisture measurement meter for determining the moisture content in material such as paper. U.S. Pat. Nos. 3,046,479 and 3,376,503 disclose an instrument for measuring the moisture content in a roll of material such as paper being wound up from a traveling web. It is a hand-held portable instrument employing twin-roller electrodes for use on rapidly moving rolls.

The twin-roller electrodes serve as a fringe-field capacitor coupled to the tank circuit of a Class C Hartley oscillator. This circuit exhibits a sensitivity to reduction of tank circuit Q due to loss loading of the roller electrodes coupled to the tank. The sensitivity to Q reduction results in a change of current which develops a voltage that i amplified and displayed on a meter. The meter reading is related to moisture content by means of a calibration curve.

A field-effect transistor is particularly desirable in this circuit because it has a large avalanche, or breakdown voltage capability, and because its range of parameters is closely controlled. Furthermore, field-effect transistors permit great flexibility in operating point selection and circuit performance design.

In operating a field-effect transistor as a Class C oscillator, it is not possible to develop self-bias in the same manner as when employing a vacuum tube or a bipolar transistor, i.e., a transistor having a collector, an emitter, and a base, as opposed to one having a drain, a gate and a source. In a Class C oscillator employing a vacuum tube, grid current flows during a small portion of the oscillator cycle, causing a self-bias voltage to be developed in the grid RC network. Similarly, when employing a bipolar transistor, the base-emitter junction functions as a diode in the forward-bias direction, causing base current to flow, thereby developing self-bias.

Since junction field-effect transistors will operate in the enhancement mode, operation in a Class C oscillator circuit is not predictable because the point of gate current flow is undefined. A field-effect transistor does not have a sharp nonlinearity about the zero-bias point. Hence, in Class C operation, it is not feasible to develop self-bias in the same manner as when employing a vacuum tube or a bipolar transistor.

Another problem present in this application is the static electric charge which builds up on material such as paper as it is wound on the roll. Therefore, the circuit must be capable of withstanding static electric charges in the proximity of the measuring electrode having a magnitude of several thousand volts.

A further problem found in this application is that the quiescent operating point of the circuit must be compensated against changes in temperature to prevent the making of inaccurate readings as the temperature changes.

Accordingly, it is an object of the present invention to provide a self-biasing arrangement for a Class C oscillator employing a field-effect transistor.

Another object of the invention is the provision of a self-biased Class C oscillator employing a field-effect transistor in which the circuit is protected against high-voltage transients.

A further object of the present invention is to provide a self-biased Class C oscillator employing a field-effect transistor in which the circuit is temperature compensated.

SUMMARY OF THE INVENTION

In accordance with these and other objects of the invention, there is provided a field-effect transistor connected in a Hartley oscillator configuration. A diode is connected to the gate of the field-effect transistor to rectify the radiofrequency signal at the gate, thereby causing a negative bias to be developed. Since the forward voltage drop of this diode is a function of temperature, a similar diode is placed in series with the source lead of the field-effect transistor to stabilize the operating point of the field-effect transistor with temperature changes.

For further temperature stabilization, a thermistor-compensated load network is employed. This network comprises a thermistor and resistor connected in series from the drain of the field-effect transistor to the power supply terminal, and a second resistor connected in parallel with the series-connected resistor and thermistor.

The biasing diode at the gate of the field-effect transistor protects the circuit against positive high-voltage transients. A second diode reverse-biased at the average drain operating potential and coupled to the gate with opposite polarity protects against negative transients. A zener diode is connected to the drain of the field-effect transistor to prevent the drain from developing transients of negative voltage, or voltages in excess of its avalanche voltage.

To further protect the circuit against high-voltage transients, the roller electrodes are coupled to the oscillator tank circuit through low-pass filters. These low-pass filters are of the pi-section type, and are loaded by radioactive neon-glow tubes.

BRIEF DESCRIPTION OF THE DRAWING

The following specification and the accompanying drawing respectively describe and illustrate an exemplary embodiment of the present invention. Consideration of the specification and the drawing will provide an understanding of the invention, including the novel features and objects thereof.

The single figure of the drawing is a schematic circuit diagram of an exemplary embodiment in accordance with the present invention.

DESCRIPTION OF A PREFERRED EMBODIMENT

Referring now to the drawing, there is shown a field-effect transistor 1 connected in a Hartley oscillator configuration for operation in a Class C mode. A number of different types of field-effect transistors may be employed in this circuit. An example of a field-effect transistor which operates satisfactorily in this circuit is the type 3N125. For this application, the oscillator may operate somewhere in the neighborhood of 10 to 15 megahertz, although the exact frequency of operation is not critical.

The source lead of the field-effect transistor 1 is connected to the anode of a diode 2, whose cathode is connected to ground. The purpose of employing diode 2, rather that connecting the source lead directly to ground, will be explained hereinafter. The diode 2 is bypassed by a capacitor 3, which may have a value of 0.01 microfarads, for example. Gate 2 of the field-effect transistor 1 is connected to the source lead of the field-effect transistor 1 through a resistor 4, which typically may have a value of 300,000 ohms.

Gate 1 of the field-effect transistor 1 is connected to the anode of a diode 5, whose cathode is connected to ground. A resistor 6 is connected in parallel with this diode 5, and a capacitor 7 is connected from gate 1 of the field-effect transistor 1 to a tap 8 on the tank coil 10 of the oscillator. The diode 5, the resistor 6 and the capacitor 7 form the biasing circuit for the field-effect transistor 1. When the oscillator is operating, a radiofrequency signal appears at gate 1 of the field-effect transistor 1. The diode 5 rectifies the signal, and in conjunction with the RC network formed by resistor 6 and capacitor 7, applies a negative bias to gate 1 of the field-effect transistor 1.

Typically, resistor 6 may have a value of 150,000 ohms, and capacitor 7 may have a value of 33 micromicrofarads. Capacitor 7 also functions as a blocking capacitor to prevent the DC supply voltage from being applied to the gate of the field-effect transistor 1. The biasing diode 5 must have a high-back resistance and a good forward characteristic at the frequency employed; that is, it should have a low-storage time and a low-dynamic resistance. Furthermore, the bias diode 5 must exhibit low capacitance in the reverse-bias mode so as not to unduly detune or load the gate circuit. Type 1N914A has been found satisfactory for this application. The forward voltage drop of the bias diode 5 is a function of temperature. Therefore, diode 2 was placed in series with the source lead of the field-effect transistor 1 to stabilize the operating point of the field-effect transistor oscillator with temperature changes. Diode 2 is selected to be identical or similar to diode 5, and thus have the same change in voltage with respect to change in temperature.

The drain lead of the field-effect transistor 1 is connected to a tap 11 near one end of the tank coil 10. A tuning capacitor 12 is connected from this tap 11 to another tap 13 near the other end of the tank coil 10. The tuning capacitor 12 may have a value on the order of 56 micromicrofarads. A bypass capacitor 14 is connected from yet another tap 15 of the tank coil 10 to ground. Typically, the tuning coil 10 may have a total of 26 turns, with tap 11 being 1-⅞ turns from one end, tap 15 being 12-⅞ turns from the same end, tap 8 being at 18-⅛ turns, and tap 13 being at 23-⅞ turns.

The positive terminal of a power supply is connected to one end of a resistor 16. The negative terminal of the power supply is connected to ground. The power supply may provide on the order of 20 volts. The other end of resistor 16 is connected through a thermistor 17 to tap 15 of the tuning coil 10. Another resistor 18 is connected in parallel with the series-connected resistor 16 and thermistor 17. These three elements form the load network for the oscillator circuit. This thermistor-compensated load network provides temperature stability of output signal change versus tank circuit loading. Typically, the thermistor 17 may be a type JA41J1 having a value of 10,000 ohms. Resistor 16 may have a value of 6,800 ohms, while resistor 18 may have a value of 3,900 ohms. The positive terminal of the power supply may be bypassed to ground by a capacitor 20 having a value of 0.002 microfarads.

It is to be understood that the component types and values mentioned in this specification are given by way of example only. For various applications it may be necessary to vary or adjust the tank circuit parameters or component values to obtain the desired operation.

When employing this oscillator for the measurement of moisture content in a roll of material such as paper, twin-roller electrodes such as those shown in U.S. Pat. No. 3,376,503 are connected to the tank circuit of the oscillator. One of the roller electrodes is connected to terminals 21 and 22, and the other roller electrode is connected to terminals 23 and 24. The twin-roller electrodes serve as fringe-field capacitors, and are represented in the drawing by capacitors 25 and 26 shown connected to terminals 21,22 and terminals 23, 24, respectively. Terminals 22 and 24 are each connected to ground. Terminal 21 is connected through an inductor 27 in series with a capacitor 28 to one end of the tuning coil 10. Similarly, terminal 23 is connected through an inductor 30 in series with a capacitor 31 to the other end of the tuning coil 10.

The oscillator circuit exhibits a sensitivity to reduction of tank circuit Q due to loss-loading of the roller electrodes coupled to the tank. This sensitivity to Q reduction results in a change of current through the oscillator circuit. An amplifier and meter may be connected to terminals 32 and 33 to indicate this change of current. Terminal 32 is connected to tap 15 of the tuning coil 10 while terminal 33 is connected to ground. The meter reading may be related to moisture content of the roll of material such as paper by means of a suitable calibration curve.

To minimize the effect of high-voltage static electric transients which may be present in the vicinity of the roller electrodes, neon-glow tubes 34 and 35 are connected from each side of inductor 27 to ground. Similarly, two neon-glow tubes 36 and 37 are connected from each side of inductor 30 to ground. In addition, a capacitor 38 is connected from the junction of inductor 27 and capacitor 28 to ground, and a capacitor 40 is connected from the junction of inductor 30 and capacitor 31 to ground.

Capacitors 28 and 31 serve as coupling capacitors and have equal capacitance. They may have a value in the range of 0.002 microfarads to 18 micromicrofarads. The fringe-field capacitance 25, inductor 27 and capacitor 38 form a pi-section low-pass filter. Similarly, fringe-field capacitance 26, inductor 30 and capacitor 40 also form a pi-section low-pass filter. These filters are adjusted to pass the oscillator operating frequency with minimum attenuation. Typically, the fringe-field capacitances 25,26 may have a value of 33 micromicrofarads. The inductors 27 and 30 are adjusted to cause the filters to pass the operating frequency, and may have approximately 11 turns.

The neon-glow tubes 34, 35, 36 and 37 load the pi-section low-pass filters. The glow tubes 34, 35, 36 and 37 ignite when a transient voltage appears having a potential in excess of their ignition voltage. There is a finite ionization time during which the transient voltage is not suppressed. Radioactive glow tubes of the NE23 type are used to keep the ionization time to a minimum.

The bias diode 5 protects against positive high-voltage transients at the gate of the field-effect transistor 1. Another diode 41 has its cathode connected to tap 8 of the tank coil 10, and its anode connected to ground. It may also be a type 1N914A. This diode 41 prevents negative transients in excess of the value of the potential at the drain of the transistor 1 from appearing at the gate, since it is back-biased to the value of the drain potential. This diode 41 does not load the oscillator tank coil at the oscillator frequency since the signal voltage at the tap 8 is about 0.5 times that at the drain.

A zener diode 42 has its cathode connected to the drain of the transistor 1, and its anode connected to ground. The zener diode 42 prevents transients in excess of its avalanche voltage from appearing at the drain. The avalanche voltage of the zener diode 42 is chosen to be less than the breakdown voltage of the field-effect transistor 1, and greater than two times the average drain voltage. A type 1N4754A has been found to be satisfactory.

Thus, there has been described a novel Class C oscillator circuit which employs a field-effect transistor and yet has means for providing self-bias. The circuit has means proving temperature stabilization and compensation. Means are also provided for protecting the circuit against high-voltage transients of thousands of volts which may be present in the proximity of measurement electrodes coupled to the tank circuit of the oscillator.

While only one embodiment of the invention has been shown and described, variations may be made, and it is intended that the foregoing disclosure shall be considered only as illustrative of the principle of the invention and not construed in a limiting sense.

I claim:

1. An oscillator circuit for a moisture content measuring system wherein radiofrequency energy in a tank circuit is coupled to materials containing moisture through fringe-field capacitance electrodes, the Q of said tank circuit being reduced as a measure of moisture content, said oscillator circuit comprising:

a field effect transistor having a source, a drain, and a gate, said transistor being connected to said tank circuit in a Class C oscillator configuration;

stabilization means for stabilizing said oscillator circuit as the Q of said tank circuit is reduced, said stabilization means including a diode connected in the gate circuit of said transistor in a rectifying configuration for a portion of the radiofrequency energy in said tank circuit whereby self-bias is provided for said oscillator circuit which is proportional to the reduction in the Q of said tank circuit.

2. The oscillator circuit of claim 1 wherein:

said stabilization means further includes a diode connected in the source circuit of said transistor for cooperation with said diode connected in the gate circuit of said transistor to provide for temperature stabilization of the operating point of said transistor.

3. The oscillator circuit of claim 1 wherein:

said stabilization means further includes a thermistor connected in the drain circuit of said transistor for cooperation with said diode connected in the gate circuit of said transistor to provide temperature stabilization of the sensitivity of the oscillator to tank circuit loading.

4. The oscillator of claim 3 wherein:

said stabilization means further includes a diode connected in the source circuit of said transistor for cooperation with said diode connected in the gate circuit and said thermistor connected in the drain circuit of said transistor to provide for temperature stabilization of the operating point of said transistor.

5. The oscillator circuit of claim 1 including:

means for dissipating transient voltage pulses appearing on said fringe-field capacitance electrodes due to operation of said moisture content measuring system in the vicinity of static electric fields, said dissipating means having a back-biased diode connected in the gate circuit of said transistor whereby negative high voltage transients are shunted through said back-biased diode.

6. The oscillator circuit of claim 5 wherein:

said dissipating means includes a zener diode connected in the drain circuit of said transistor for preventing the voltage at the drain from exceeding the avalanche voltage of said zener diode.

7. The oscillator circuit of claim 1 including coupling means for coupling each of said fringe-field capacitance electrodes to said tank said coupling means allowing radiofrequency energy to pass to and from said tank to said electrodes but preventing the passing of high-voltage transients appearing on said electrodes due to operation of said moisture content measuring system in the vicinity of static electric fields, said coupling means comprising:

a first gas discharge tube connected across each of said electrodes, said discharge tube being ionized when high-voltage transients appear on said electrodes;

a pi-section low-pass filter connected between each electrode and said tank circuit, said low-pass filter passing the radiofrequencies generated by said oscillator circuit and substantially attenuating the radiofrequencies associated with high-voltage transient pulses; and a second gas discharge tube connected across the junction of said low-pass filter and said tank circuit, said second discharge tube being ionized when remaining high-voltage transient pulses appear at said junction to effectively shunt said transients through said discharge tube.

8. The oscillator circuit of claim 7 including:

a back-biased diode connected in the gate circuit of said transistor for dissipating negative high-voltage transients in the gate circuit.

9. The oscillator circuit of claim 8 including:

a thermistor in the drain circuit of said transistor for temperature stabilization of the sensitivity of the oscillator to tank circuit loading.

* * * * *